(12) United States Patent
Ando et al.

(10) Patent No.: US 7,246,079 B2
(45) Date of Patent: Jul. 17, 2007

(54) METHOD OF PREDICTING INITIAL INPUT OF NEW PRODUCT, SYSTEM FOR PREDICTING INITIAL INPUT OF NEW PRODUCT, AND RECORDING MEDIUM

(75) Inventors: Hideyuki Ando, Oita (JP); Takashi Kanazawa, Oita (JP); Naoto Miyashita, Kawasaki (JP); Koji Nishimoto, Oita (JP)

(73) Assignee: Fujitsu Limited, Kawasaki (JP)

( * ) Notice: Subject to any disclaimer, the term of this patent is extended or adjusted under 35 U.S.C. 154(b) by 1129 days.

(21) Appl. No.: 09/870,021

(22) Filed: May 31, 2001

(65) Prior Publication Data

US 2002/0082902 A1 Jun. 27, 2002

(30) Foreign Application Priority Data

Dec. 22, 2000 (JP) ............................. 2000-391514

(51) Int. Cl.
*G06F 17/30* (2006.01)
(52) U.S. Cl. ...................................................... 705/10
(58) Field of Classification Search .................. 705/10
See application file for complete search history.

(56) References Cited

U.S. PATENT DOCUMENTS

| | | | | |
|---|---|---|---|---|
| 5,402,519 A | * | 3/1995 | Inoue et al. | 706/16 |
| 5,521,814 A | * | 5/1996 | Teran et al. | 700/266 |
| 5,774,868 A | * | 6/1998 | Cragun et al. | 705/10 |
| 6,029,139 A | * | 2/2000 | Cunningham et al. | 705/10 |
| 6,032,125 A | | 2/2000 | Ando | |
| 6,978,249 B1 | * | 12/2005 | Beyer et al. | 705/10 |

FOREIGN PATENT DOCUMENTS

| | | | | |
|---|---|---|---|---|
| JP | 07175787 A | * | 7/1995 | |
| JP | 9-120935 | | 5/1997 | |
| JP | 10-143490 | | 5/1998 | |
| JP | 2000-200260 | | 7/1998 | |
| JP | 2000112914 A | * | 4/2000 | |

OTHER PUBLICATIONS

Yao et al., "Forecasting and Analysis of Marketing Data Using Neural Networks," Journal of Information Science and Engineering, 1998 [retrieved from Google Scholar].*
Poh et al. "Neural Networks for the Analysis and Forecasting of Advertising and Promotion Impact," International Journal of Intelligent Systems in Accounting, Finance & Management, 1998 [retrieved from Google Scholar].*

* cited by examiner

*Primary Examiner*—C. Michelle Tarae
(74) *Attorney, Agent, or Firm*—Staas & Halsey LLP

(57) ABSTRACT

Based on numerical values with respect to factors influencing shares of existing products and a new product evaluated by more than one people, a structured neural network calculates predictive shares of the new product predicted by the respective persons. Comprehensive evaluations on the respective products and the new product are calculated for each person, based on the numerical values with respect to the respective factors. Correlation coefficients between the comprehensive evaluations on the respective products by the respective persons and the actual shares are calculated. The predictive shares calculated by the structural neural network are layered out in accordance with the correlation coefficients for the respective person. Average values of the predictive shares and confidence intervals are calculated for the respective layers, and based on them and the calculation result obtained by the structured neural network, a share of the new product is predicted.

14 Claims, 11 Drawing Sheets

FIG. 6

| | F001 | | | F002 | | | F003 | | |
|---|---|---|---|---|---|---|---|---|---|
| | LAUNCH TIME | INTER-MEDIATE TIME | END TIME | LAUNCH TIME | INTER-MEDIATE TIME | END TIME | LAUNCH TIME | INTER-MEDIATE TIME | END TIME |
| SALES CHANNEL | 2 | 2 | 2 | 2 | 2 | 2 | 2 | 3 | 3 |
| FUNCTION | 3 | 3 | 3 | 2 | 2 | 2 | 4 | 4 | 4 |
| DESIGN·COLOR | 5 | 5 | 5 | 3 | 3 | 3 | 2 | 2 | 2 |
| PRICE | 5 | 5 | 5 | 7 | 7 | 7 | 5 | 6 | 7 |
| QUALITY | 4 | 4 | 4 | 8 | 8 | 8 | 5 | 5 | 5 |
| BRAND POWER | 1 | 1 | 1 | 1 | 1 | 1 | 1 | 1 | 1 |
| SEASON | 5 | 5 | 5 | 5 | 5 | 5 | 9 | 9 | 9 |
| SHARE | 10.0% | 8.0% | 8.0% | 4.0% | 4.0% | 4.0% | 12.0% | 8.0% | 8.0% |

| | F004 | | | F005 | | | NEW PRODUCT | | |
|---|---|---|---|---|---|---|---|---|---|
| | LAUNCH TIME | INTER-MEDIATE TIME | END TIME | LAUNCH TIME | INTER-MEDIATE TIME | END TIME | LAUNCH TIME | INTER-MEDIATE TIME | END TIME |
| SALES CHANNEL | 3 | 3 | 3 | 3 | 3 | 3 | 3 | | |
| FUNCTION | 4 | 4 | 4 | 6 | 6 | 6 | 7 | | |
| DESIGN·COLOR | 4 | 4 | 4 | 6 | 6 | 6 | 7 | | |
| PRICE | 6 | 7 | 7 | 5 | 6 | 6 | 6 | | |
| QUALITY | 9 | 9 | 9 | 3 | 4 | 5 | 6 | | |
| BRAND POWER | 1 | 1 | 1 | 1 | 1 | 1 | 1 | | |
| SEASON | 5 | 5 | 5 | 10 | 10 | 10 | 8 | | |
| SHARE | 4.0% | 4.0% | 3.0% | 10.0% | 10.0% | 8.0% | | | |

FIG. 7

| SHARE | | Mr.A | Mr.B EVALUATION CHARACTERISTICS 1 | Mr.C EVALUATION CHARACTERISTICS 2 | EVALUATION CHARACTERISTICS 3 | ⋮ | | | | | | | |
|---|---|---|---|---|---|---|---|---|---|---|---|---|---|
| KNOWN | ← Mr.A | OBJECT 1 | 3 | 4 | 7 | | | | | | | | |
| | ← Mr.B | OBJECT 2 | 5 | 3 | 4 | | | | | | | | |
| | ← Mr.C | OBJECT 3 | 7 | 4 | 5 | | | | | | | | |
| | | OBJECT 4 | 6 | 4 | 6 | | | | | | | | |
| | | OBJECT 5 | 8 | 6 | 8 | | | | | | | | |
| | | OBJECT 6 | 8 | 5 | 5 | | | | | | | | |
| | | ⋮ | · | · | · | | | | | | | | |
| | | OBJECT n | 3 | 7 | 4 | | | | | | | | |
| UNKNOWN | | OBJECT X | 5 | 3 | 7 | | | | | | | | |

EVALUATOR: Mr.A, Mr.B, Mr.C ...

| | CHANNEL | FUNCTION | DESIGN | PRICE | QUALITY | BRAND | PRINCIPAL COMPONENT POINT |
|---|---|---|---|---|---|---|---|
| Mr.A | | | | | | | A-F001 |
| Mr.B | | | | | | | B-F001 |
| . . | | | | | | | |
| Mr.Z | | | | | | | Z-F001 |

F002

| | CHANNEL | FUNCTION | DESIGN | PRICE | QUALITY | BRAND | PRINCIPAL COMPONENT POINT |
|---|---|---|---|---|---|---|---|
| Mr.A | | | | | | | A-F002 |
| Mr.B | | | | | | | B-F002 |
| . . | | | | | | | |
| Mr.Z | | | | | | | Z-F002 |

NEW PRODUCT

| | CHANNEL | FUNCTION | DESIGN | PRICE | QUALITY | BRAND | PRINCIPAL COMPONENT POINT |
|---|---|---|---|---|---|---|---|
| Mr.A | | | | | | | A-NEW PRODUCT |
| Mr.B | | | | | | | B-NEW PRODUCT |
| . . | | | | | | | |
| Mr.Z | | | | | | | Z-NEW PRODUCT |

FIG. 9

| | TYPE | SHARE | PRINCIPAL COMPONENT POINT | CORRELATION COEFFICIENT |
|---|---|---|---|---|
| Mr.A | F001 | 10 | A-F001 | 0.4875 |
| | F002 | 13 | A-F002 | |
| | F003 | 10 | A-F003 | |
| | F004 | 4 | A-F004 | |
| | F005 | 3.5 | A-F005 | |

| | TYPE | SHARE | PRINCIPAL COMPONENT POINT | CORRELATION COEFFICIENT |
|---|---|---|---|---|
| Mr.B | F001 | 10 | B-F001 | 0.6049 |
| | F002 | 13 | B-F002 | |
| | F003 | 10 | B-F003 | |
| | F004 | 4 | B-F004 | |
| | F005 | 3.5 | B-F005 | |

⋮

| | TYPE | SHARE | PRINCIPAL COMPONENT POINT | CORRELATION COEFFICIENT |
|---|---|---|---|---|
| Mr.Z | F001 | 10 | Z-F001 | 0.8171 |
| | F002 | 13 | Z-F002 | |
| | F003 | 10 | Z-F003 | |
| | F004 | 4 | Z-F004 | |
| | F005 | 3.5 | Z-F005 | |

FIG. 10

|  | TYPE | SHARE | PRINCIPAL COMPONENT POINT | CORRELATION COEFFICIENT |
|---|---|---|---|---|
| Mr.A | F001 | 10 | A-F001 | 0.4875 |
|  | F002 | 13 | A-F002 |  |
|  | F003 | 10 | A-F003 |  |
|  | F004 | 4 | A-F004 |  |
|  | F005 | 3.5 | A-F005 |  |
|  | NEW PRODUCT | ? | A-NEW PRODUCT |  |

|  | TYPE | SHARE | PRINCIPAL COMPONENT POINT | CORRELATION COEFFICIENT |
|---|---|---|---|---|
| Mr.B | F001 | 10 | B-F001 | 0.6049 |
|  | F002 | 13 | B-F002 |  |
|  | F003 | 10 | B-F003 |  |
|  | F004 | 4 | B-F004 |  |
|  | F005 | 3.5 | B-F005 |  |
|  | NEW PRODUCT | ? | B-NEW PRODUCT |  |

⋮

|  | TYPE | SHARE | PRINCIPAL COMPONENT POINT | CORRELATION COEFFICIENT |
|---|---|---|---|---|
| Mr.Z | F001 | 10 | Z-F001 | 0.8171 |
|  | F002 | 13 | Z-F002 |  |
|  | F003 | 10 | Z-F003 |  |
|  | F004 | 4 | Z-F004 |  |
|  | F005 | 3.5 | Z-F005 |  |
|  | NEW PRODUCT | ? | Z-NEW PRODUCT |  |

FIG. 11

| CORRELATION COEFFICIENT (EQUAL OR MORE THAN) | NUMBER OF EVALUATORS | CONFIDENCE INTERVAL Lower 95% | AVERAGE VALUE | CONFIDENCE INTERVAL Upper 95% |
|---|---|---|---|---|
| 0.60 | 13 | 8.99 | 10.23 | 11.47 |
| 0.65 | 7 | 8.79 | 10.49 | 12.19 |
| 0.70 | 5 | 7.93 | 10.03 | 12.12 |
| 0.75 | 4 | 9.77 | 10.98 | 12.19 |
| 0.80 | 3 | 11.49 | 11.60 | 11.70 |

METHOD OF PREDICTING INITIAL INPUT OF NEW PRODUCT, SYSTEM FOR PREDICTING INITIAL INPUT OF NEW PRODUCT, AND RECORDING MEDIUM

BACKGROUND OF THE INVENTION

The present invention relates to a method of predicting an initial input of a new product which is for predicting a sales volume or market share at the launch of the new product, a system for predicting an initial input of a new product which is for predicting a sales volume or market share at the launch of the new product, and a recording medium which can be read with a computer and which stores a program which causes a computer to predict a sales volume or market share at the launch of the new product.

To quickly provide excellent products to a market at low prices is becoming an essential strategy for a company which manufactures and sells products in order to survive in a competition in business, and a cycle of this is becoming shorter and shorter. Meanwhile, how large a share (a market share) would be and how large the production should be based on what level of a predictive volume, i.e., a quantity of the initial launch (an initial input) is an issue for the launch of a new product into a market.

While prediction mechanisms and systems assuming that a future volume is an extension of a past volume have heretofore been already provided, mainly used among methods of predicting an initial input of a new product has been a method which applies a trend of an existing similar product with reference to a past record of actual sales, shipment and the like or a method which uses preceding experiences, hunch or a wide variety of techniques such as statistical schemes.

However, with such a method, it is difficult to determine which similar product is applicable and predict an initial input amid fierce changes in life cycle.

In addition, there is another problem that a company has been repeating similar experiences but yet to make a specific use of those experiences. Still other problem is that while it takes time to cultivate professional marketing people, it is difficult to satisfy all in such an environment of today.

Among techniques for predicting an initial input or a share of a new product is a method based on a regression model which is disclosed in Japanese Patent Application Laid-Open No. 9-120395 (1997) and a method based on a questionnaire result on customers who purchased a product and a similar questionnaire-based evaluation result from in-house people which is disclosed in Japanese Patent Application Laid-Open No. 2000-200260.

BRIEF SUMMARY OF THE INVENTION

The present invention has been made in view of the circumstance described above. Accordingly, an object of the invention according to a first through a fifth aspects is to provide an initial input prediction method for a new product with which it is possible to predict a sales volume or market share at the launch of the new product into a market.

An object of the invention according to a sixth aspect is to provide an initial input prediction system for a new product with which it is possible to predict a sales volume or market share at the launch of the new product into a market.

An object of the invention according to an seventh through a tenth aspects is to provide a recording medium which can be read with a computer and which stores a program which realizes the initial input prediction method for a new product according to the first through the fifth aspects of the invention and the initial input prediction system for a new product according to the sixth aspect of the invention.

A method of predicting an initial input of a new product according to the first aspect of the invention is a method of predicting an initial input of a new product for predicting a sales volume or market share at the launch of a new product, and characterized by comprising steps of making more than one people numerically evaluate a plurality of past products and said new product, with respect to a plurality of factors which are considered to influence a sales volume or market share; calculating comprehensive evaluations on said products and said new products for each one of said people based on numerical values with respect to said factors, calculating correlation coefficients between the comprehensive evaluations on said products by each one of said people and actual sales volumes or actual market shares of said products, obtaining relationships between the comprehensive evaluations on said products by each one of said people and the actual sales volumes or actual market shares of said products, calculating a sales volume or market share of said new product for each one of said people based on the relationships and the comprehensive evaluations on said new product, layering the calculated sales volumes or market shares of said new product for said more than one people based on the correlation coefficients for said more than one people, calculating average values and confidence intervals of the sales volumes or market shares of said new product in the respective layers; and predicting a sales volume or market share of said new product based on the average values and the confidence intervals for the respective layers.

A method of predicting an initial input of a new product according to the second aspect of the invention is a method of predicting an initial input of a new product for predicting a sales volume or market share at the launch of a new product, and characterized in that more than one people numerically evaluate a plurality of past products and said new product, with respect to a plurality of factors which are considered to influence a sales volume or market share, that a structured neural network calculates a sales volume or market share of said new product for each one of said people based on numerical values on said products and said new products given by each one of said people with respect to said factors and actual sales volumes or actual market shares of said products, and obtains said factors contributing to the calculation and the magnitudes of said factors, that comprehensive evaluations on said products and said new products for each one of said people are calculated based on the numerical values with respect to said factors, correlation coefficients are calculated between the comprehensive evaluations on said products by each one of said people and the actual sales volumes or actual market shares of said products, the sales volumes or market shares of said new product calculated for said more than one people by said structured neural network are layered out based on the correlation coefficients for said more than one people, average values and confidence intervals of the sales volumes or market shares of said new product in the respective layers are calculated, and that a sales volume or market share of said new product is predicted based on the average values and the confidence intervals for the respective layers, the sales volumes or market shares calculated for said more than one people by said structured neural network, and said factors contributing to the calculation and the magnitudes of said factors.

A method of predicting an initial input of a new product according to the third aspect of the invention is a method of predicting an initial input of a new product for predicting a sales volume or market share at the launch of a new product, and characterized in that more than one people numerically evaluate a plurality of past products and said new product, with respect to a plurality of factors which are considered to influence a sales volume or market share, that a structured neural network calculates a sales volume or market share of said new product for each one of said people based on numerical values on said products and said new products given by each one of said people with respect to said factors and actual sales volumes or actual market shares of said products, and obtains said factors contributing to the calculation and the magnitudes of said factors, that comprehensive evaluations on said products and said new products for each one of said people are calculated based on the numerical values with respect to said factors, relationships are calculated between the comprehensive evaluations on said products by each one of said people and the actual sales volumes or actual market shares of said products, the sales volumes or market shares of said new product are calculated for said more than one people based on the relationships and the comprehensive evaluations on said new product, and that a sales volume or market share of said new product is predicted based on the calculated sales volumes or market shares of said new product for said more than one people, the sales volumes or market shares calculated for said more than one people by said structured neural network, and said factors contributing to the calculation and the magnitudes of said factors.

A method of predicting an initial input of a new product according to the fourth aspect of the invention is a method of predicting an initial input of a new product for predicting a sales volume or market share at the launch of a new product, and characterized in that more than one people numerically evaluate a plurality of past products and said new product, with respect to a plurality of factors which are considered to influence a sales volume or market share, that a structured neural network calculates a sales volume or market share of said new product for each one of said people based on numerical values on said products and said new products given by each one of said people with respect to said factors and actual sales volumes or actual market shares of said products, and obtains said factors contributing to the calculation and the magnitudes of said factors, that comprehensive evaluations on said products and said new products for each one of said people are calculated based on the numerical values with respect to said factors, correlation coefficients are calculated between the comprehensive evaluations on said products by each one of said people and the actual sales volumes or actual market shares of said products, relationships are calculated between the comprehensive evaluations by each one of said people and the actual sales volumes or actual market shares of said products, the sales volumes or market shares of said new product are calculated for said more than one people based on the relationships and the comprehensive evaluations on said new product, the calculated sales volumes or market shares of said new product for said more than one people are layered out based on the correlation coefficients for said more than one people, average values and confidence intervals of the sales volumes or market shares of said new product for the respective layers are calculated, and that a sales volume or market share of said new product is predicted based on the average values and the confidence intervals in the respective layers, the sales volumes or market shares calculated for said more than one people by said structured neural network, and said factors contributing to the calculation and the magnitudes of said factors.

In addition, in the above mentioned first through fourth aspects, the comprehensive evaluations may be calculated through principal component analysis based on the numerical values with respect to said factors.

A method of predicting an initial input of a new product according to the fifth aspect of the invention is characterized in that the relationships between the comprehensive evaluations on said products and the actual sales volumes or actual market shares of said products are calculated through regression analysis in which the comprehensive evaluations are used as a predictor variable and the actual sales volumes or actual market shares are used as a criterion variable.

A system of predicting an initial input of a new product according to the fifth aspect of the invention is characterized in that the method of predicting an initial input of a new product according to any one of the first through the fourth aspects is used.

The initial input prediction method for a new product and the initial input prediction system for a new product according to the present invention allow a model in the structured neural network to receive sales volumes or shares of a plurality of existing products upon their market launch, for example, and evaluations made by more than one people on those existing products, and to learn about relationships between these, whereby a sales volume or market share of a new product at the launch into a market is predicted. Further, as to those among evaluation items (factors) for the evaluation which are less relevant to the sales volumes or shares (i.e., those not relevant beyond a certain constant value), the relationships between such evaluation items and the sales volumes or shares are suppressed by means of a growth retardant characteristic of the structured neural network, and therefore, it is possible to select an evaluation item which has a strong influence over the sales volumes or shares.

In addition, using a statistical scheme, sales volume or market shares of the new product at the launch into the market is calculated based on past records made by the respective evaluators (which are relationships between the evaluations and the actual sales volumes or shares), the calculated sales volumes or shares upon the market launch are layered out based on correlation coefficients expressing the relationships, and average values and confidence intervals of the sales volumes or market shares in the respective layers are calculated.

Further, the calculated average values and the confidence intervals of the sales volumes or market shares for the respective layers are compared with the calculated sales volumes or shares upon the market launch calculated for the respective evaluators by the structured neural network. Thus, the sales volumes or shares upon the market launch calculated by the structured neural network become reliable.

Alternatively, the average values and the confidence intervals in the respective layers may be calculated using the sales volumes or shares as the sales volumes or shares upon the market launch calculated by the structured neural network.

This makes it possible to predict a sales volume or market share of the new product at the launch of the new product into a market. It is also possible to narrow down ambiguous evaluation items regarding products and choose evaluation items which have the largest influence over the sales volume or market share upon the launch into the market. It is further possible to quantify vague evaluations made by the human beings, and therefore, apply to marketing in the future.

A recording medium according to the seventh aspect of the invention is a computer readable recording medium which stores a program for causing a computer to predict a sales volume or market share at the launch of a new product, the recording medium being characterized by storing a program including: a procedure for causing a computer to input data which are evaluations in the form of numerical values made by more than one people on a plurality of past products and the new product, with respect to a plurality of factors, including actual sales volume or actual market shares of the products, which are considered to influence a sales volume or market share; a procedure for causing a computer to calculate comprehensive evaluations on the products and the new products for each one of the people based on the numerical values with respect to the factors; a procedure for causing a computer to calculate correlation coefficients between the comprehensive evaluations on the products by each one of the people and the actual sales volumes or actual market shares of the products; a procedure for causing a computer to calculate relationships between the comprehensive evaluations on the products by each one of the people and the actual sales volumes or actual market shares of the products; a procedure for causing a computer to calculate the sales volumes or market shares of the new product for the more than one people, based on the relationships and the comprehensive evaluations on the new product; a procedure for causing a computer to layer out the sales volumes or market shares of the new product calculated through the procedure for the more than one people, based on the correlation coefficients for the more than one people; a procedure for causing a computer to calculate average values and confidence intervals of the sales volumes or market shares for the respective layers which are created through the procedure; and a procedure for causing a computer to output the average values and the confidence intervals in the respective layers calculated through the procedure.

A recording medium according to the eighth aspect of the invention is a computer readable recording medium which stores a program for causing a computer to predict a sales volume or market share at the launch of a new product, said recording medium being characterized by storing: a program for causing a computer to execute a procedure for entering data which are evaluations in the form of numerical values made by more than one people on a plurality of past products and said new product, with respect to a plurality of factors, including actual sales volumes or actual market shares of said products, which are considered to influence a sales volume or market share; a structured neural network which calculates sales volumes or market shares of said new product for said more than one people based on the numerical values with respect to said factors given on said products and said new product given by said more than one people and the actual sales volumes or actual market shares of said products, said structured neural network obtaining said factors contributing to the calculation and the magnitudes of said factors; and a program for causing a computer to execute the following procedures which are: a procedure of calculating comprehensive evaluations on said products and said new products for each one of said people based on the numerical values with respect to said factors; a procedure of calculating correlation coefficients between the comprehensive evaluations on said products by each one of said people and the actual sales volumes or actual market shares of said products; a procedure of layering the sales volumes or market shares of said new product calculated by said structured neural network for said more than one people, based on the correlation coefficients for said more than one people; a procedure of calculating average values and confidence intervals of the sales volumes or market shares for the respective layers which are created through said procedure; and a procedure of outputting the average values and the confidence intervals in the respective layers calculated through said procedure, the sales volumes or market shares calculated for said more than one people by said structured neural network, and said factors contributing to the calculation and the magnitudes of said factors.

A recording medium according to the ninth aspect of the invention is a computer readable recording medium which stores a program for causing a computer to predict a sales volume or market share at the launch of a new product, said recording medium being characterized by storing: a program for causing a computer to execute a procedure for entering data which are evaluations in the form of numerical values made by more than one people on a plurality of past products and said new product, with respect to a plurality of factors, including actual sales volumes or actual market shares of said products, which are considered to influence a sales volume or market share; a structured neural network which calculates sales volumes or market shares of said new product for said more than one people based on the numerical values with respect to said factors given on said products and said new product given by said more than one people and the actual sales volumes or actual market shares of said products, said structured neural network obtaining said factors contributing to the calculation and the magnitudes of said factors; and a program for causing a computer to execute the following procedures which are: a procedure of calculating comprehensive evaluations on said products and said new products for each one of said people based on the numerical values with respect to said factors; a procedure of obtaining relationships between the comprehensive evaluations on said products by each one of said people and the actual sales volumes or actual market shares of said products; a procedure of calculating the sales volumes or market shares of said new product for said more than one people based on the relationships and the comprehensive evaluations on said new product; and a procedure of outputting the sales volumes or market shares of said new product calculated for said more than one people through said procedure, the sales volumes or market shares calculated for said more than one people by said structured neural network, and said factors contributing to the calculation and the magnitudes of said factors.

A recording medium according to the tenth aspect of the invention is a computer readable recording medium which stores a program for causing a computer to predict a sales volume or market share at the launch of a new product, said recording medium being characterized by storing: a program for causing a computer to execute a procedure for entering data which are evaluations in the form of numerical values made by more than one people on a plurality of past products and said new product, with respect to a plurality of factors, including actual sales volumes or actual market shares of said products, which are considered to influence a sales volume or market share; a structured neural network which calculates sales volumes or market shares of said new product for said more than one people based on the numerical values with respect to said factors given on said products and said new product given by said more than one people and the actual sales volumes or actual market shares of said products, said structured neural network obtaining said factors contributing to the calculation and the magnitudes of said factors; and a program for causing a computer to execute the following procedures which are: a procedure of calculating comprehensive evaluations on said products and said new products for each one of said people based on the numerical values with respect to said factors; a procedure of calculating correlation efficients between the comprehensive evaluations on said products by each one of said people and the actual sales volumes or actual market shares of said products; a procedure of obtaining relationships between the comprehensive evaluations on said products by each one of said people and the actual sales volumes or actual market shares of said products; a procedure of calculating the sales volumes or market shares of said new product for said more than one people, based on the relationships and the comprehensive evaluations on said new product; a procedure of layering the sales volumes or market shares of said new product calculated through said procedure for said more than one people, based on the correlation coefficients for said more than one people; a procedure of calculating average values and confidence intervals of the sales volumes or market shares for the respective layers which are created through said procedure; and a procedure of outputting the average values and the confidence intervals in the respective layers, the sales volumes or market shares calculated for said more than one people by said structured neural network, and said factors contributing to the calculation and the magnitudes of said factors.

A computer which reads the recording medium according to the present invention can be used as the initial input prediction system for a new product of the present invention, and can execute the initial input prediction method for a new product of the present invention.

The above and further objects and features of the invention will more fully be apparent from the following detailed description with accompanying drawings.

BRIEF DESCRIPTION OF THE SEVERAL VIEWS OF THE DRAWINGS

FIG. 6 is an explanatory diagram which shows an example of a questionnaire chart for collecting data;

FIG. 7 is an explanatory diagram which shows an example of an evaluation table;

FIG. 8 is an explanatory diagram for describing operations of the initial input prediction system for a new product according to the present invention;

FIG. 9 is an explanatory diagram for describing operations of the initial input prediction system for a new product according to the present invention;

FIG. 10 is an explanatory diagram for describing operations of the initial input prediction system for a new product according to the present invention; and FIG. 11 is an explanatory diagram which shows an example of a statistical chart.

DETAILED DESCRIPTION OF THE INVENTION

In the following, an embodiment of the present invention will be described with reference to the associated drawings.

Figure 1:
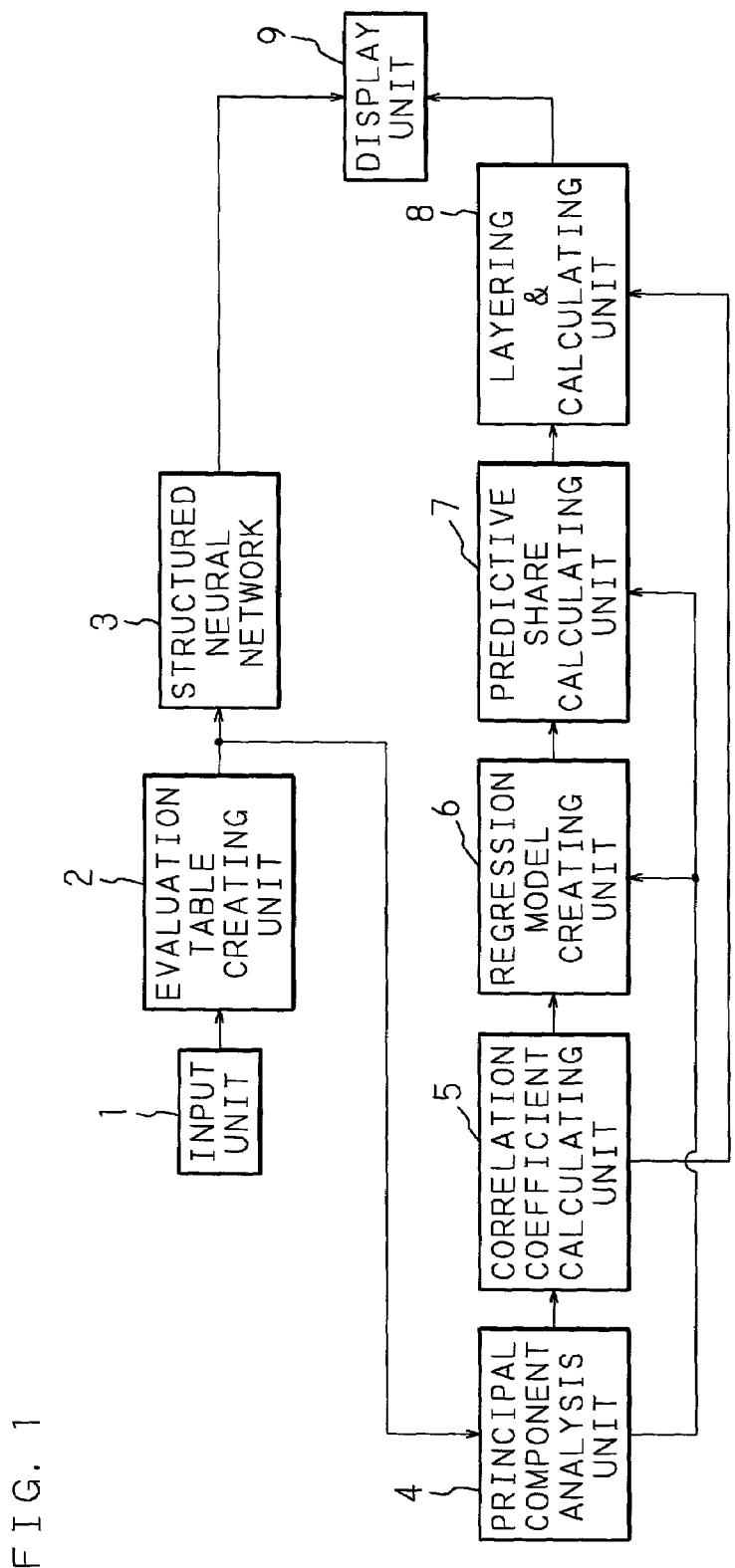
FIG. 1 is a functional block diagram showing a structure of an essential portion of an embodiment of an initial input prediction method for a new product and an initial input prediction system for a new product according to the present invention.

FIG. 1 is a functional block diagram showing an essential structure of an embodiment of an initial input prediction method for a new product and an initial input prediction system for a new product according to the present invention. The initial input prediction system which is formed by a personal computer comprises an input unit 1 for entering data which are numerical evaluations made by more than one people regarding a plurality of factors, including actual shares (or similarly, sales volumes) of a plurality of past products, which influence shares of the past products and a new product, and an evaluation table creating unit 2 which creates evaluation tables which will be described in detail from the data received through the input unit 1.

The initial input prediction system for a new product further comprises a structured neural network 3 which calculates each individual person's new product share based on the evaluation tables created by the evaluation table creating unit 2 and obtaining a factor which contributes to the calculation and the magnitude of the factor, a principal component analysis unit 4 which calculates comprehensive evaluations by each individual person on the plurality of past products and the new product by means of principal component analysis based on the numerical values with respect to the respective factors, and a correlation coefficient calculating unit 5 which calculates correlation coefficients between comprehensive evaluations on the respective past products calculated for the respective people by the principal component analysis unit 4 and the actual shares of the past products.

The initial input prediction system for a new product further comprises a regression model creating unit 6 which obtains relationships between the comprehensive evaluations on the past products calculated by the principal component analysis unit 4 and the actual shares of the past products by means of regression analysis in which the comprehensive evaluations are used as a predictor variable and the actual shares are used as a criterion variable, a predictive share calculating unit 7 which calculates a share of the new product predicted by the respective people based on the relationships (a regression model) obtained by the regression model creating unit 6 and the comprehensive evaluations on the new product, a layering & calculating unit 8 which performs layering based on the correlation coefficients for the respective people calculated by the predictive share calculating unit 7 and calculates average values and confidence intervals of the predictive shares of the new product for the respective layers, and a display unit 9 which displays (outputs) the average values of the predictive shares and the confidence intervals in the respective layers obtained and calculated by the layering & calculating unit 8, the shares for the respective people calculated by the structured neural network 3, a factor contributing to the calculation and the magnitude of the factor.

Figure 2:
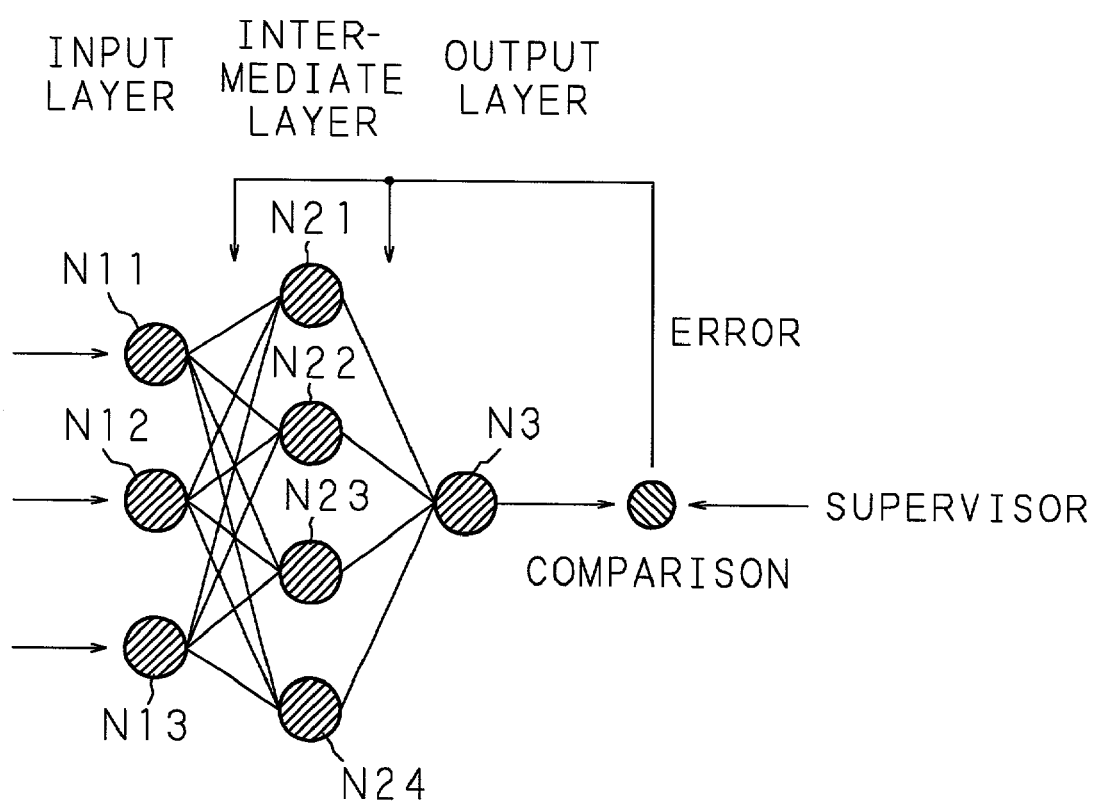
FIG. 2 is an explanatory diagram which schematically shows a structure of a structured neural network.
Figure 3:
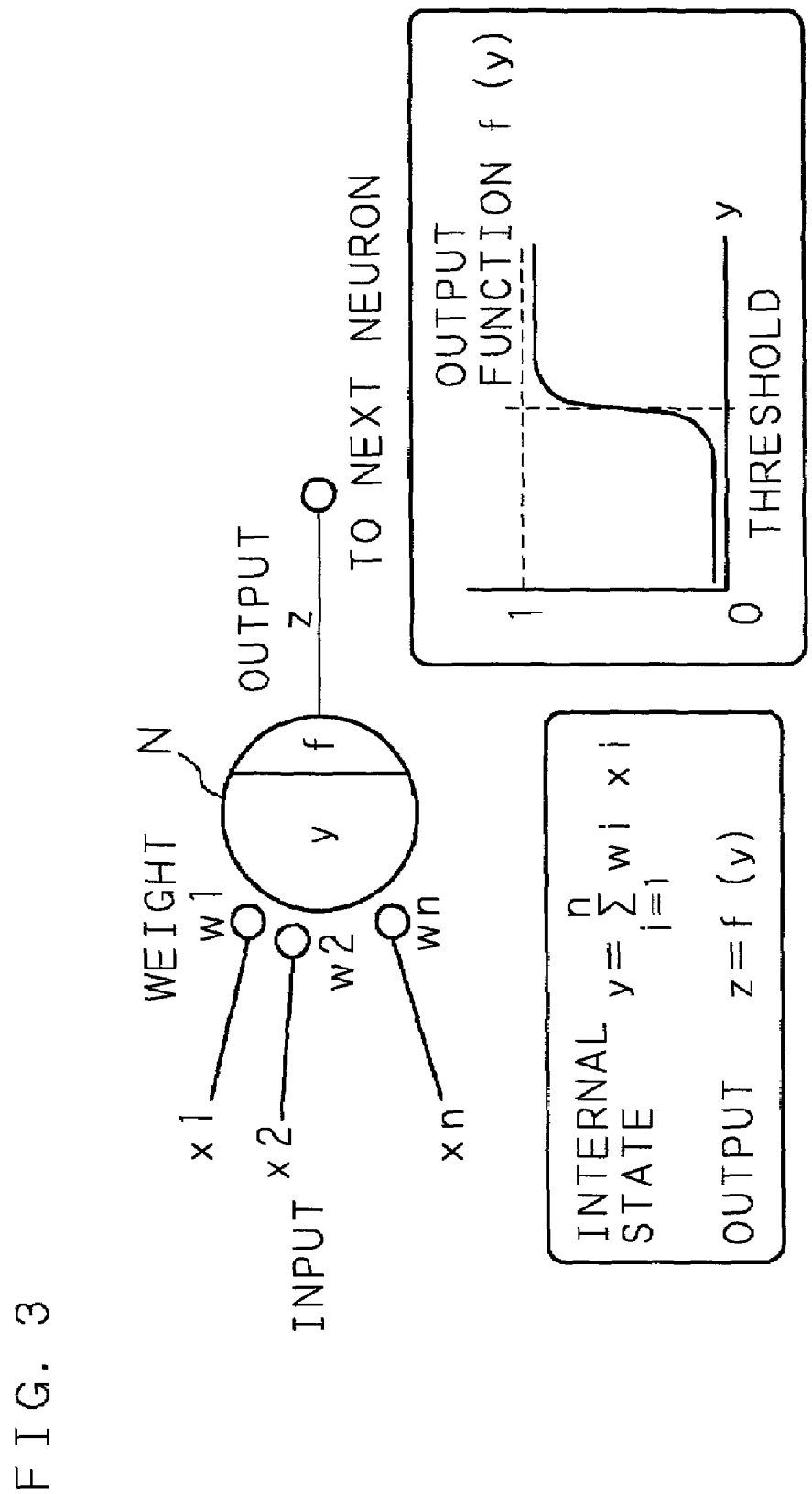
FIG. 3 is an explanatory diagram which schematically shows a neuron.

FIG. 2 is an explanatory diagram which schematically shows a structure of the structured neural network 3. In the structured neural network 3, neurons N as those shown in FIG. 3 are layered out in an input layer including neurons N11 through N13, an intermediate layer including neurons N21 through N24 and an output layer including a neuron N3 so as to constitute a network.

The neurons N11 through N13 in the input layer are each connected with all of the neurons N21 through N24 in the intermediate layer, and the neurons N21 through N24 in the intermediate layer are connected with the neuron N3 in the output layer.

The number of the neurons N11 through N13 in the input layer is equal to the number of input signals, while the number of the neurons N21 through N24 in the intermediate layer is the number needed for computing and determined by an empirical rule.

The neuron N performs weighting on inputs x1 through xn using weights w1 through wn, respectively, adds up the weighted inputs x1*w1 through xn*wn and outputs a resulting value z. The neuron N has a predetermined threshold value with respect to the output z as a growth retardant characteristic, and accordingly, does not output unless the output z is equal to or larger than the threshold value.

The structured neural network 3 provides the neurons N11 through N13 in the input layer with evaluation points made by a certain person each on each one of a plurality of factors which must influence the share of a past product, for example, and when the share of the product is given as a supervisor signal, adjusts the weights w1 through wn so that an error between the output from the neuron N3 belonging to the output layer and the share becomes small.

The structured neural network 3 learns by repeating this on a plurality of past products and accordingly becomes capable of outputting a share in accordance with each evaluation point above made by the certain person and severing connection which is due to a factor not contributing to calculation of the share. As a result, this leaves a predictive share of a new product regarding which the respective evaluation points were entered, a factor contributing to the calculation of the predictive share, and a weight which is a degree of this.

Figure 4:
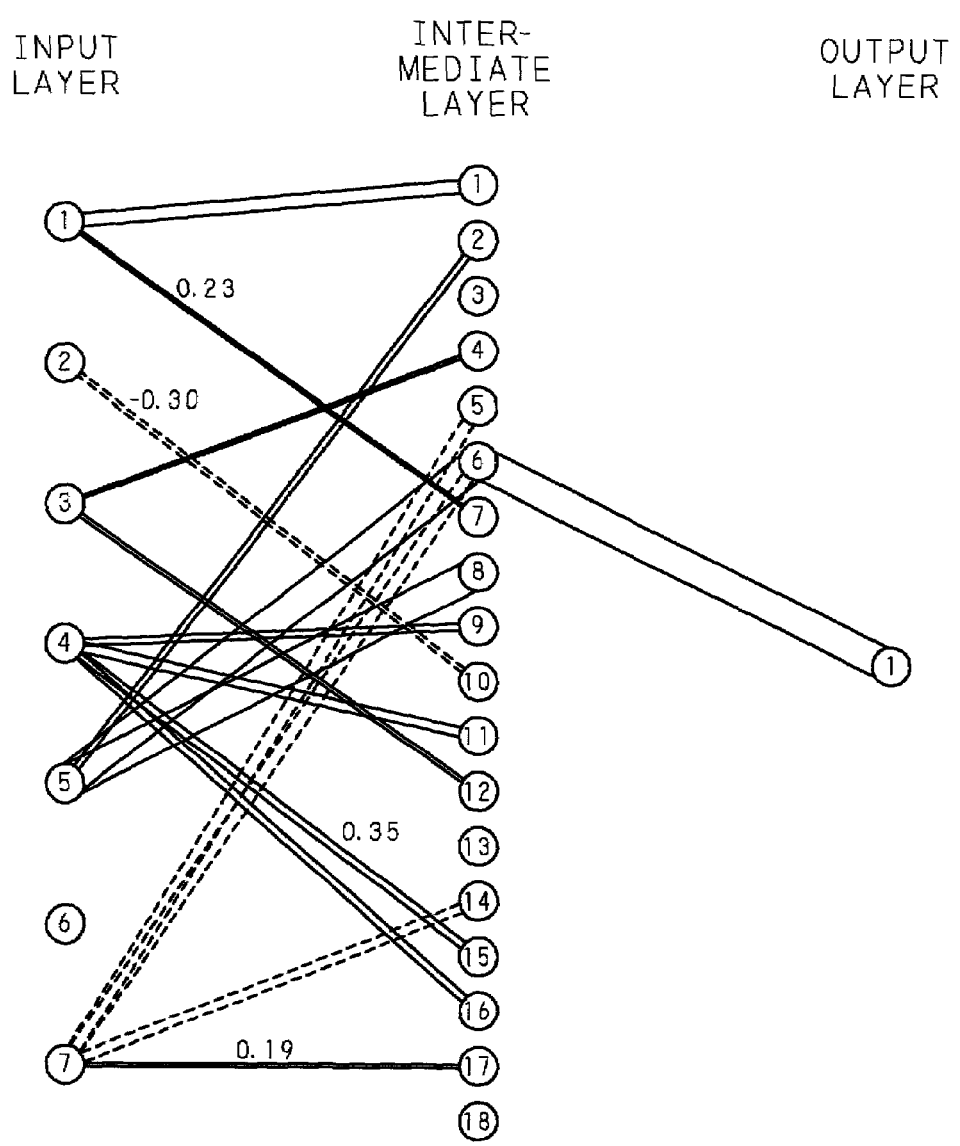
FIG. 4 is an explanatory diagram which schematically shows operations of the structured neural network.

For instance, the learning as that described above applied to seven factors which must influence shares of past products leads to a result as that shown in FIG. 4. The widths of the lines are representative of weights among which some are positive weights increasing shares and others are negative weights decreasing shares.

Although the respective neurons are in mutual connection with each other at the initial learning stage, as the learning progresses, the mutual connection dissolves gradually, thereby leaving factors of the neurons (5), (7) in the input layer as factors relevant to the shares (output). The factor of the neuron (7), however, is a negative factor.

Figure 5:
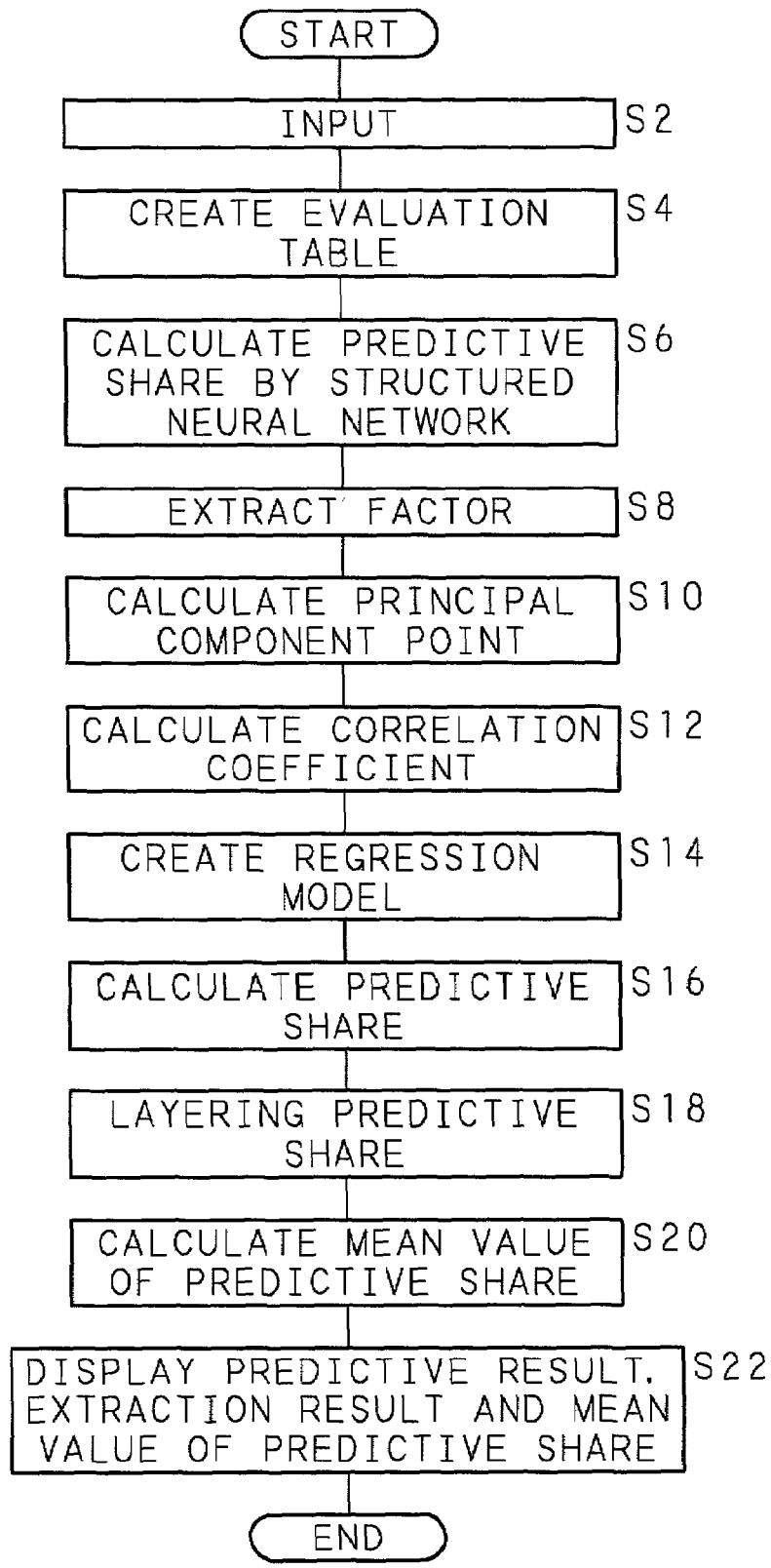
FIG. 5 is a flow chart showing operations of the initial input prediction system for a new product according to the present invention.

In the following, operations of the initial input prediction system for a new product having such a structure will be described with reference to the flow chart in FIG. 5.

First, the input unit 1 of the initial input prediction system for a new product receives data which are numerical evaluations made by more than one people regarding a plurality of factors, including actual shares of a plurality of past products, which influence shares of the past products and a new product (S2).

The numerical evaluation data made by these people are in the form of a questionnaire chart as that shown in FIG. 6, for example. Evaluation factors which are considered to influence the shares are the sales channel, the function, the design, the price, the quality, the brand and the season. Evaluation scores on the scale of ten points are given on each one of products F1 through F5 each at the launch, an intermediate point and the end with respect to each one of the factors, together with actual shares at the respective time points. Evaluation scores on the scale of ten points are given on a new product with respect to each one of the factors.

Presumably, the higher the evaluation score is, the more a consumer wishes to buy, while the lower the evaluation score is, the less the consumer wishes to buy.

While an evaluation on a certain product is different between different evaluator (people who evaluate), there is only one resultant share yielded. The share therefore can be said to be a value which represents the status or the position of the product.

Some evaluators may provide a correct evaluation (which is close to the status determined by the society), while other evaluators may not be as such. Those people who can evaluate closely to the status determined by the society are to be found from a number of evaluators so that a share of a new product will be predicted based on those people's sense.

Next, the evaluation table creating unit 2 creates evaluation tables as those shown in FIG. 7, one each for each evaluator (S4). The evaluation tables are the summary of scores on the respective products F1 through Fn, which are objects 1 through n of evaluation, with respect to the evaluation characteristics (which are the respective evaluation factors) irrespective of the time such as at the launch, an intermediate point and the end, and scores on the new product which is an object X of evaluation with respect to the evaluation characteristics.

Next, using the data in the evaluation tables, the structured neural network 3 calculates predictive shares of the new product (S6) and extracts a factor contributing to the calculation of the predictive shares and a weight which is the degree of the contribution (S8), as described earlier.

Next, the principal component analysis unit 4 calculates comprehensive evaluations on the plurality of past products and the new product by the respective evaluators through principal component analysis based on the scores with respect to the respective evaluation factors (S10), and as shown in FIG. 8, summarizes the scores by the respective evaluators with respect to the respective evaluation factors and principal component scores which are comprehensive evaluations by the respective evaluators, on each one of the past products and the new product. While a plurality of principal component scores are produced in principal component analysis, to be used here is a score attributed to a first principal component whose contribution is largest.

Next, the correlation coefficient calculating unit 5 calculates correlation coefficients between the comprehensive evaluations by the respective evaluators on the respective past products calculated by the principal component analysis unit 4 (S10) and the actual shares of these past products (S12), and as shown in FIG. 9, summarizes the actual shares of the past products, the principal component scores which are the comprehensive evaluations on the past products, and the correlation coefficients between these two, for the respective evaluators.

The correlation coefficients have a value between −1.0 and +1.0. The closer to +1.0 the value is, the stronger the positive correlation is. In general, it is possible to say that the correlation is strong if a correlation coefficient is +0.7 or larger. The stronger the positive correlation provided by an evaluator is, the more suitable the evaluator is considered to be for prediction of a share.

Next, using the principal component scores on the respective past products calculated by the principal component analysis unit 4 (S10) and the actual shares of the past products, the regression model creating unit 6 creates by computing a regression model $$y=ax+b$$

wherein the principal component score on each past product is a predictor variable x and the associated actual share is a criterion variable y (S14).

Next, the predictive share calculating unit 7 calculates predictive shares of the new product predicted by the respective evaluators (S16) based on the regression models for the respective evaluators created by the regression model creating unit 6 (S14) and the principal component scores on the new product by the respective evaluators, and as shown in FIG. 10, summarizes the actual shares of the respective products, the principal component scores on the respective products, the correlation coefficients between these two, and the predictive shares of the new product, for the respective evaluators.

Next, based on the correlation coefficients for the respective evaluators calculated by the correlation coefficient calculating unit 5 (S12), the layering & calculating unit 8 layers out the predictive shares of the new product for the respective evaluators calculated by the predictive share calculating unit 7 (S18), and calculates average values and confidence intervals of the predictive shares of the new product in the respective layers (S20).

The predictive shares of the new product by the respective evaluators are layered out by the value of the correlation coefficients for the respective evaluators (for every 0.05 at and beyond +0.6) and the average values and 95%-confidence intervals of the predictive shares of the new product in the respective layers are calculated, thereby creating a statistical chart as that shown in FIG. 11 which describes the number of the evaluators, the lower limit of the confidence interval, the average value and the upper limit of the confidence interval of the predictive shares for each layer.

According to the statistical chart shown in FIG. 11, it is possible to judge that the share of the new product could be somewhere between 8.0% and 12.2%, particularly between 10.0% and 11.6%.

The layering & calculating unit 8 may layer out the predictive shares of the new product for the respective evaluators calculated by the structured neural network 3 (S6) based on the correlation coefficients for the respective evaluators calculated by the correlation coefficient calculating unit 5 (S12) to thereby calculate the average values and the confidence intervals of the predictive shares of the new product in the respective layers.

Next, the display unit 9 displays the statistical chart (FIG. 11) created through the layering and calculation executed by the layering & calculating unit 8 (S20), as well as the charts of the correlation coefficients and the predictive shares of the new product for the respective evaluators and the results of the operations described above such as the predictive shares by the respective evaluators calculated by the structured neural network 3, the factors contributed to the calculation and the magnitude of the factors (S22). In addition, the display unit 9 displays the original data from which the results of the operations were obtained, if necessary.

In accordance with the display provided by the display unit 9, it is possible to determine that the predictive share of the new product in the layer which bears the large correlation coefficient given by the evaluators is highly reliable, and hence, to use this predictive share. It is also possible to narrow down the evaluation factors regarding the product and choose the evaluation factors which have the largest influence over the share at the launch into the market.

While the embodiment described above is on the assumption that personal computers are used, with a computer program for realizing similar operations to those of the initial input prediction system for a new product above recorded on a portable recording medium, such as a magnetic disk and a CD-ROM, or downloaded from a recording medium, such as a memory at the end of a connection line, installed at a center such as a distribution server, for instance, which can communicate the computer program with a personal computer through the line or by radio, it is possible to cause a personal computer to carry out an image processing method for prediction of an initial input of a new product as in the embodiment described above.

Using the initial input prediction method for a new product according to the first aspect of the invention, it is possible to predict a sales volume or market share of the new product at the launch of the new product into a market.

Using the initial input prediction system for a new product according to the second through the seventh aspects of the invention, it is possible to predict a sales volume or market share of the new product at the launch of the new product into a market. It is also possible to narrow down ambiguous evaluation items regarding products and choose evaluation items which have the largest influence over the sales volume or market share upon the launch into the market. It is further possible to quantify vague evaluations made by the human beings, and therefore, apply to marketing in the future.

Using a computer reading the recording medium according to the eighth through the tenth aspects of the invention, it is possible to use the computer as the initial input prediction system for a new product of the present invention, and execute the initial input prediction method for a new product of the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. A method of predicting an initial input of a new product for predicting a sales volume or market share at the launch of a new product, comprising:
    numerically evaluating a plurality of past products and said new product, with respect to a plurality of factors which are considered to influence a sales volume or market share, by more than one people; and
    calculating a sales volume or market share of said new product for each one of said people based on numerical values on said past products and said new products given by each one of said people with respect to said factors and actual sales volumes or actual market shares of said past products, and obtaining said factors contributing to the calculation and the magnitude of said factors, via a structured neural network, wherein
    comprehensive evaluations on said past products and said new products for each one of said people are calculated based on the numerical values with respect to said factors, correlation coefficients are calculated between the comprehensive evaluations on said past products by each one of said people and the actual sales volumes or actual market shares of said past products, the sales volumes or market shares of said new product calculated for said more than one people by said structured neural network are layered out based on the correlation coefficients for said more than one people, average values and confidence intervals of the sales volumes or market shares of said new product in the respective layers are calculated, and a sales volume or market share of said new product is predicted based on the average values and the confidence intervals for the respective layers, the sales volumes or market shares calculated for said more than one people by said structured neural network, and said factors contributing to the calculation and the magnitude of said factors.

2. A method of predicting an initial input of a new product for predicting a sales volume or market share at the launch of a new product, comprising:

numerically evaluating a plurality of past products and said new product, with respect to a plurality of factors which are considered to influence a sales volume or market share, by more than one people; and calculating a sales volume or market share of said new product for each one of said people based on numerical values on said past products and said new products given by each one of said people with respect to said factors and actual sales volumes or actual market shares of said past products, and obtaining said factors contributing to the calculation and the magnitude of said factors, via a structured neural network, wherein comprehensive evaluations on said past products and said new products for each one of said people are calculated based on the numerical values with respect to said factors, relationships are calculated between the comprehensive evaluations on said past products by each one of said people and the actual sales volumes or actual market shares of said past products, the sales volumes or market shares of said new product are calculated for said more than one people based on the relationships and the comprehensive evaluations on said new product, and a sales volume or market share of said new product is predicted based on the calculated sales volumes or market shares of said new product for said more than one people, the sales volumes or market shares calculated for said more than one people by said structured neural network, and said factors contributing to the calculation and the magnitude of said factors.

3. A method of predicting an initial input of a new product as set forth in claim 2, wherein the relationships between the comprehensive evaluations on said past products and the actual sales volumes or actual market shares of said past products are calculated through regression analysis in which the comprehensive evaluations are used as a predictor variable and the actual sales volumes or actual market shares are used as a criterion variable.

4. A method of predicting an initial input of a new product for predicting a sales volume or market share at the launch of a new product, comprising:

numerically evaluating a plurality of past products and said new product, with respect to a plurality of factors which are considered to influence a sales volume or market share, by more than one people; and calculating a sales volume or market share of said new product for each one of said people based on numerical values on said past products and said new products given by each one of said people with respect to said factors and actual sales volumes or actual market shares of said past products, and obtaining said factors contributing to the calculation and the magnitude of said factors, via a structured neural network, wherein comprehensive evaluations on said past products and said new products for each one of said people are calculated based on the numerical values with respect to said factors, correlation coefficients are calculated between the comprehensive evaluations on said past products by each one of said people and the actual sales volumes or actual market shares of said past products, relationships are calculated between the comprehensive evaluations by each one of said people and the actual sales volumes or actual market shares of said past products, the sales volumes or market shares of said new product are calculated for said more than one people based on the relationships and the comprehensive evaluations on said new product, the calculated sales volumes or market shares of said new product for said more than one people are layered out based on the correlation coefficients for said more than one people, average values and confidence intervals of the sales volumes or market shares of said new product in the respective layers are calculated, and a sales volume or market share of said new product is predicted based on the average values and the confidence intervals for the respective layers, the sales volumes or market shares calculated for said more than one people by said structured neural network, and said factors contributing to the calculation and the magnitude of said factors.

5. A method of predicting an initial input of a new product as set forth in claim 4, wherein the relationships between the comprehensive evaluations on said past products and the actual sales volumes or actual market shares of said past products are calculated through regression analysis in which the comprehensive evaluations are used as a predictor variable and the actual sales volumes or actual market shares are used as a criterion variable.

6. A system for predicting an initial input of a new product which uses a method of predicting an initial input of a new product for predicting a sales volume or market share at the launch of a new product, comprising:

an evaluation unit, taking input data from more than one people, numerically evaluating a plurality of past products and said new product, with respect to a plurality of factors which are considered to influence a sales volume or market; and a structured neural network calculating a sales volume or market share of said new product for each one of said people based on numerical values on said past products and said new products given by each one of said people with respect to said factors and actual sales volumes or actual market shares of said past products, and obtaining said factors contributing to the calculation and the magnitude of said factors, wherein comprehensive evaluations on said past products and said new products for each one of said people are calculated based on the numerical values with respect to said factors, correlation coefficients are calculated between the comprehensive evaluations on said past products by each one of said people and the actual sales volumes or actual market shares of said past products, the sales volumes or market shares of said new product calculated for said more than one people by said structured neural network are layered out based on the correlation coefficients for said more than one people, average values and confidence intervals of the sales volumes or market shares of said new product in the respective layers are calculated, and a sales volume or market share of said new product is predicted based on the average values and the confidence intervals for the respective layers, the sales volumes or market shares calculated for said more than one people by said structured neural network, and said factors contributing to the calculation and the magnitude of said factors.

7. A system for predicting an initial input of a new product which uses a method of predicting an initial input of a new product for predicting a sales volume or market share at the launch of a new product, comprising:

an evaluation unit, taking input data from more than one peoples, numerically evaluating a plurality of past products and said new product, with respect to a plurality of factors which are considered to influence a sales volume or market share; and a structured neural network calculating a sales volume or market share of said new product for each one of said people based on numerical values on said past products and said new products given by each one of said people with respect to said factors and actual sales volumes or actual market shares of said past products, and obtaining said factors contributing to the calculation and the magnitude of said factors, wherein comprehensive evaluations on said past products and said new products for each one of said people are calculated based on the numerical values with respect to said factors, relationships are calculated between the comprehensive evaluations on said past products by each one of said people and the actual sales volumes or actual market shares of said past products, the sales volumes or market shares of said new product are calculated for said more than one people based on the relationships and the comprehensive evaluations on said new product, and a sales volume or market share of said new product is predicted based on the calculated sales volumes or market shares of said new product for said more than one people, the sales volumes or market shares calculated for said more than one people by said structured neural network, and said factors contributing to the calculation and the magnitude of said factors.

8. The system for predicting an initial input of a new product as set forth in claim 7, wherein the relationships between the comprehensive evaluations on said past products and the actual sales volumes or actual market shares of said past products are calculated through regression analysis in which the comprehensive evaluations are used as a predictor variable and the actual sales volumes or actual market shares are used as a criterion variable.

9. A system for predicting an initial input of a new product which uses a method of predicting an initial input of a new product for predicting a sales volume or market share at the launch of a new product, wherein an evaluation units taking input data from more than one peoples, numerically evaluating a plurality of past products and said new product, with respect to a plurality of factors which are considered to influence a sales volume or market share; and a structured neural network calculating a sales volume or market share of said new product for each one of said people based on numerical values on said past products and said new products given by each one of said people with respect to said factors and actual sales volumes or actual market shares of said past products, and obtaining said factors contributing to the calculation and the magnitudes of said factors, wherein comprehensive evaluations on said past products and said new products for each one of said people are calculated based on the numerical values with respect to said factors correlation coefficients are calculated between the comprehensive evaluations on said past products by each one of said people and the actual sales volumes or actual market shares of said past products, relationships are calculated between the comprehensive evaluations by each one of said people and the actual sales volumes or actual market shares of said past products, the sales volumes or market shares of said new product are calculated for said more than one people based on the relationships and the comprehensive evaluations on said new product, the calculated sales volume or market shares of said new product for said more than one people are layered out based on the correlation coefficients for said more than one people, average values and confidence intervals of the sales volumes or market shares of said new product in the respective layers are calculated, and a sales volume or market share of said new product is predicted based on the average values and the confidence intervals for the respective layers, the sales volumes or market shares calculated for said more than one people by said structured neural network, and said factors contributing to the calculation and the magnitude of said factors.

10. The system for predicting an initial input of a new product as set forth in claim 9, wherein the relationships between the comprehensive evaluations on said past products and the actual sales volumes or actual market shares of said past products are calculated through regression analysis in which the comprehensive evaluations are used as a predictor variable and the actual sales volumes or actual market shares are used as a criterion variable.

11. A computer readable recording medium which stores a program for causing a computer to predict a sales volume or market share at the launch of a new product, said recording medium storing a program comprising:

a procedure for causing a computer to input data which are evaluations in the form of numerical values made by more than one people on a plurality of past products and said new product, with respect to a plurality of factors, including actual sales volume or actual market shares of said past products, which are considered to influence a sales volume or market share;

a procedure for causing a computer to calculate comprehensive evaluations on said past products and said new products for each one of the people based on the numerical values with respect to said factors;

a procedure for causing a computer to calculate correlation coefficients between said comprehensive evaluations on said past products by each one of the people and the actual sales volumes or actual market shares of said past products;

a procedure for causing a computer to calculate relationships between said comprehensive evaluations on said past products by each one of the people and the actual sales volumes or actual market shares of said past products;

a procedure for causing a computer to calculate the sales volumes or market shares of said new product for the more than one people, based on said relationships and said comprehensive evaluations on said new product;

a procedure for causing a computer to layer out the sales volumes or market shares of said new product calculated through said procedure for the more than one people, based on said correlation coefficients for the more than one people;

a procedure for causing a computer to calculate average values and confidence intervals of the sales volumes or market shares for the respective layers which are created through said procedure; and a procedure for causing a computer to output the average values and the confidence intervals in the respective layers calculated through said procedure.

12. A computer readable recording medium which stores a program for causing a computer to predict a sales volume or market share at the launch of a new product, said recording medium storing:

a program for causing a computer to execute a procedure for entering data which are evaluations in the form of numerical values made by more than one people on a plurality of past products and said new product, with respect to a plurality of factors, including actual sales volumes or actual market shares of said past products, which are considered to influence a sales volume or market share;

a program for causing a computer to calculate sales volumes or market shares of said new product for said more than one people based on the numerical values with respect to said factors given on said past products and said new product given by said more than one people and the actual sales volumes or actual market shares of said past products, said structured neural network obtaining said factors contributing to the calculation and the magnitude of said factors, via a structured neural network; and a program for causing a computer to execute:
- a procedure of calculating comprehensive evaluations on said past products and said new products for each one of said people based on the numerical values with respect to said factors;
- a procedure of calculating correlation coefficients between the comprehensive evaluations on said past products by each one of said people and the actual sales volumes or actual market shares of said past products;
- a procedure of layering the sales volumes or market shares of said new product calculated by said structured neural network for said more than one people, based on the correlation coefficients for said more than one people;
- a procedure of calculating average values and confidence intervals of the sales volumes or market shares for the respective layers which are created through said procedure; and
- a procedure of outputting the average values and the confidence intervals in the respective layers calculated through said procedure, the sales volumes or market shares calculated for said more than one people by said structured neural network, and said factors contributing to the calculation and the magnitude of said factors.

13. A computer readable recording medium which stores a program which causes a computer to predict a sales volume or market share at the launch of a new product, said recording medium storing:

a program for causing a computer to execute a procedure for entering data which are evaluations in the form of numerical values made by more than one people on a plurality of past products and said new product, with respect to a plurality of factors, including actual sales volumes or actual market shares of said past products, which are considered to influence a sales volume or market share;

a program for causing a computer to calculate sales volumes or market shares of said new product for said more than one people based on the numerical values with respect to said factors given on said past products and said new product given by said more than one people and the actual sales volumes or actual market shares of said past products, said structured neural network obtaining said factors contributing to the calculation and the magnitude of said factors, via a structured neural network; and a program for causing a computer to execute:
- a procedure of calculating comprehensive evaluations on said past products and said new products for each one of said people based on the numerical values with respect to said factors;
- a procedure of obtaining relationships between the comprehensive evaluations on said past products by each one of said people and the actual sales volumes or actual market shares of said past products;
- a procedure of calculating the sales volumes or market shares of said new product for said more than one people based on the relationships and the comprehensive evaluations on said new product; and
- a procedure of outputting the sales volumes or market shares of said new product calculated for said more than one people through said procedure, the sales volumes or market shares calculated for said more than one people by said structured neural network, and said factors contributing to the calculation and the magnitude of said factors.

14. A computer readable recording medium which stores a program which causes a computer to predict a sales volume or market share at the launch of a new product, said recording medium storing:

a program for causing a computer to execute a procedure for entering data which are evaluations in the form of numerical values made by more than one people on a plurality of past products and said new product, with respect to a plurality of factors, including actual sales volumes or actual market shares of said past products, which are considered to influence a sales volume or market share;

a program for causing a computer to calculate sales volumes or market shares of said new product for said more than one people based on the numerical values with respect to said factors given on said past products and said new product given by said more than one people and the actual sales volumes or actual market shares of said past products, said structured neural network obtaining said factors contributing to the calculation and the magnitude of said factors, via a structured neural network; and a program for causing a computer to execute:
- a procedure of calculating comprehensive evaluations on said past products and said new products for each one of said people based on the numerical values with respect to said factors;
- a procedure of calculating correlation coefficients between the comprehensive evaluations on said past products by each one of said people and the actual sales volumes or actual market shares of said past products;

a procedure of obtaining relationships between the comprehensive evaluations on said past products by each one of said people and the actual sales volumes or actual market shares of said past products;

a procedure of calculating the sales volumes or market shares of said new product for said more than one people, based on the relationships and the comprehensive evaluations on said new product;

a procedure of layering the sales volumes or market shares of said new product calculated through said procedure for said more than one people, based on the correlation coefficients for said more than one people;

a procedure of calculating average values and confidence intervals of the sales volumes or market shares for the respective layers which are created through said procedure; and a procedure of outputting the average values and the confidence intervals in the respective layers, the sales volumes or market shares calculated for said more than one people by said structured neural network, and said factors contributing to the calculation and the magnitude of said factors.

* * * * *

UNITED STATES PATENT AND TRADEMARK OFFICE
CERTIFICATE OF CORRECTION

PATENT NO. : 7,246,079 B2
APPLICATION NO. : 09/870021
DATED : July 17, 2007
INVENTOR(S) : Hideyuki Ando et al.

It is certified that error appears in the above-identified patent and that said Letters Patent is hereby corrected as shown below:

Column 14, Line 48, change "market;" to --market share;--.

Column 15, Line 58, change "units" to --unit,--.

Column 15, Line 59, change "peoples," to --people,--.

Column 16, Line 7, change "factors" to --factors,--.

Signed and Sealed this

Eighteenth Day of December, 2007

JON W. DUDAS
*Director of the United States Patent and Trademark Office*